United States Patent [19]

Kasakoff

[11] 4,143,590
[45] Mar. 13, 1979

[54] COFFEE MAKER ASSEMBLY

[76] Inventor: Sam Kasakoff, 329 E. 58th St., New York, N.Y. 10022

[21] Appl. No.: 879,594

[22] Filed: Feb. 21, 1978

[51] Int. Cl.² ............................................. A47J 31/02
[52] U.S. Cl. ......................................... 99/296; 99/306
[58] Field of Search ................. 99/292, 293, 296, 300, 99/302 R, 306, 307, 316, 317, 323

[56] References Cited

U.S. PATENT DOCUMENTS

| | | | |
|---|---|---|---|
| 1,833,823 | 11/1931 | Buckner | 99/296 |
| 2,401,529 | 6/1946 | Varney | 99/296 |
| 3,336,857 | 8/1967 | Knodt | 99/296 |
| 3,348,469 | 10/1967 | Kasakoff | 99/323 |

Primary Examiner—Robert W. Jenkins
Attorney, Agent, or Firm—Michael Ebert

[57] ABSTRACT

A coffee maker assembly constituted by a decanter for boiling water and a separate container for producing with some of this water a highly-concentrated coffee brew, the container having a cap permeable to liquid and gas. The container is seatable in an inverted position over the decanter whereby steam generated by boiling water penetrates the cap and functions to express the highly-concentrated brew from the container into the water to intermingle therewith to produce a brew of the desired concentration.

9 Claims, 8 Drawing Figures

U.S. Patent  Mar. 13, 1979  Sheet 1 of 2  4,143,590
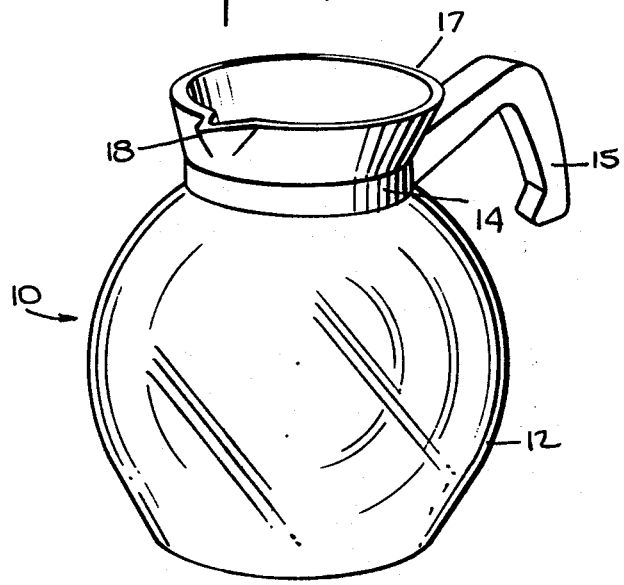
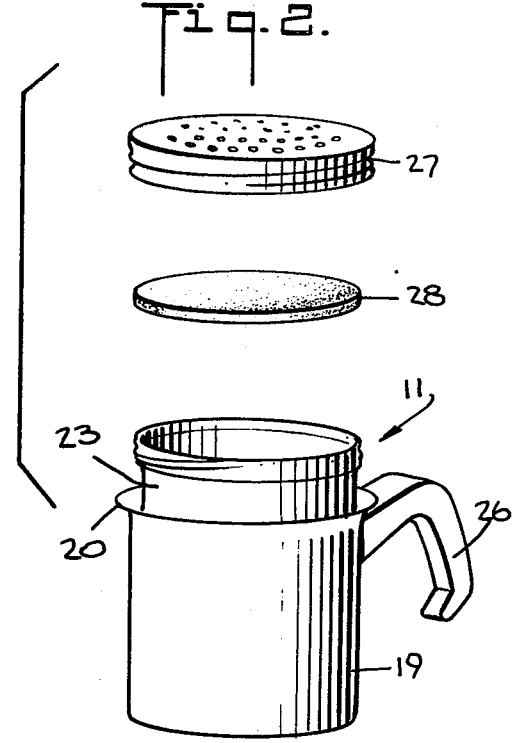
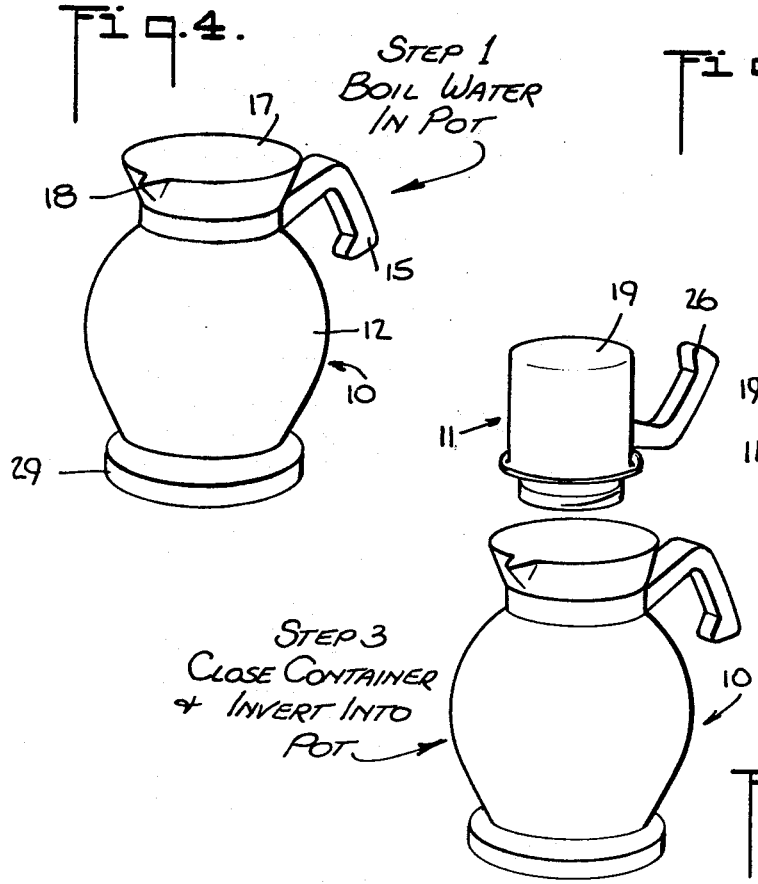
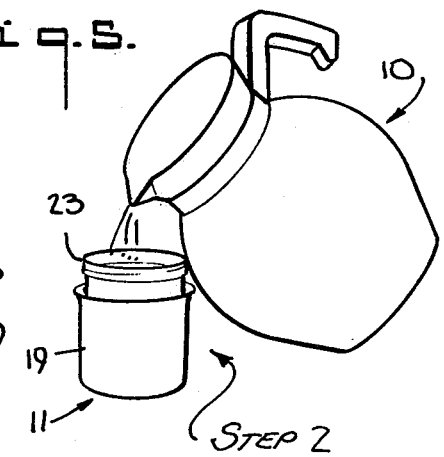

COFFEE MAKER ASSEMBLY

BACKGROUND OF INVENTION

This invention relates generally to apparatus for brewing coffee, and more particularly to improved coffee makers adapted to brew coffee quickly and efficiently without boiling of the brew to produce an aromatic beverage of high quality.

The simplest technique for brewing coffee is the so-called pot method in which a charge of ground coffee is deposited in a pot of boiling water and allowed to steep until a brew of the proper concentration is produced. This traditional technique has certain drawbacks, some of which arise from the nature of ground, roasted coffee. Roasted coffee contains about 1 to 2% of alkaloid caffein, and while it also contains glucose, dextrin and protein, its characteristic aroma is due primarily to oily substances known as caffeol.

In making pot coffee, one must wait for the coffee grounds to settle, otherwise the grounds will remain dispersed in the brew and the beverage will be unpleasant to the taste. On the other hand, since the grounds are not separated from the liquid, a point may be reached where coffee concentration is excessive or the oils boil out to impart a disagreeable flavor to the brew. Thus the quality of pot coffee is difficult to control.

The drip method generally produces coffee of better quality than the pot method, for it makes use of a double-cup container whose upper section holds the charge of ground coffee. In the drip method, boiling water is poured over the coffee grounds and the resultant brew trickles through the pores in the bottom of the upper section into the lower section of the container. The disadvantage of the drip method is that it is relatively slow and the trickle of beverage may be impeded or altogether arrested should the wet coffee grounds pack together and become impermeable.

The filter method is similar to the drip method and produces a brew of good quality, except that the coffee grounds are deposited in a funnel-shaped paper filter, permeable only to the beverage. This method is also quite slow, for the coffee grounds tend to clog the filter and no pressure is developed to accelerate the slow trickle of the beverage through the filter. The well-known coffee percolator produces a coffee brew more quickly. But since in this technique the boiling beverage is recirculated through the coffee grounds, the aromatic oils are volatilized and the resultant beverage is relatively flat.

Thus when brewing quickly with recirculated boiling water as in a percolator, or with live steam as in an expresso machine, the aromatic oils are volatilized and the brew is rendered flat, whereas when brewing with water brought to a boil as in the drip or filter method, the coffee is of better quality but the brewing process is much slower. Hence, those known techniques which are slow produce a coffee brew of good quality and those which are fast produce an inferior beverage.

With a view to overcoming the drawbacks inherent in existing techniques, the Kasakoff patent 3,348,469 discloses a coffee brewer in which a concentrated coffee brew is produced in a perforated container that floats upside down within a pot of boiling water. The floating container is subjected to steam which enters the container through filtered perforations therein, the steam serving to express the brew into the boiling pot water. While this technique produces a superior brew in no more than about a minute, it involves a relatively complicated procedure.

SUMMARY OF INVENTION

Accordingly, it is the main object of this invention to provide a simple, easily-operated coffee maker assembly which quickly and efficiently produces a highly aromatic coffee beverage of superior quality.

A significant feature of the invention resides in a brewing process in which a concentrated coffee brew is subjected to steam pressure to force the brew into hot water to provide a diluted brew of the proper concentration, the brewing process being accelerated without a concomitant loss of quality.

Also an object of the invention is to provide a coffee maker assembly which is capable of extracting a greater amount of good quality coffee brew from a pound of coffee than the amount obtainable from a conventional coffee maker.

Thus while a standard filter-type coffee maker is capable of deriving about 40 to 60 cups of coffee brew from one pound of ground coffee (the number of cups depends to some extent on how fine the coffee is ground), with a coffee maker in accordance with the invention, one can realize as high as 80 cups of brewed coffee from the same pound of coffee. Inasmuch as the market price of coffee per pound has risen sharply in recent years, the savings effected by the present invention are considerable.

More particularly, it is an object of this invention to provide a coffee maker assembly constituted by a decanter for boiling water and a separate container for producing a highly-concentrated coffee brew, the container being seatable on the decanter in an inverted position whereby steam generated by boiling water in the decanter functions to express the highly-concentrated brew from the container into the water to intermingle therewith to produce a brew of the desired concentration.

Briefly stated, in a coffee maker in accordance with the invention, the neck of a decanter for boiling water is provided with an outwardly-extending flange surrounded by the cylindrical wall of a spout.

The separate container which cooperates with the decanter is formed by an inner cylindrical cup coaxially-supported within an outer cylindrical cup to define spaces therebetween which function as a stream jacket, the outer cup having a diameter which corresponds to that of the decanter neck. The inner cup is provided with a removable perforated cap having a filter element therein to render the cap permeable to liquid and gas but not to coffee grounds.

Water is boiled in the decanter in an amount sufficient to make a desired amount of coffee brew, and a portion of this boiling water is poured into the inner cup of the container over a charge of ground coffee to produce a highly-concentrated brew which partially fills the inner cup. After the inner cup is capped, the container is inverted over the decanter, the lip of the outer cup being seated on the flange of the decanter to effectively seal the decanter whereby the spaces in the container between the cups are in communication with the interior of the decanter and steam evolving from the boiling water fills these spaces and also penetrates the cap of the inner cup to produce a head of pressurized gas over the highly concentrated brew. This pressure acts to quickly express the brew into the decanter water to produce a brew of the proper concentration.

OUTLINE OF DRAWINGS

For a better understanding of the invention as well as other objects and further features thereof, reference is made to the following detailed description to be read in conjunction with the accompanying drawings, wherein:

FIG. 1 illustrates, in perspective, the decanter included in a two-component coffee maker assembly in accordance with the invention;

FIG. 2 is an exploded view of the container included in the coffee maker;

FIG. 4 shows the first step in a process for producing a coffee brew using an assembly in accordance with the invention;

FIG. 5 shows the second step in the process;

FIG. 6 shows the third step in the process;

DESCRIPTION OF INVENTION

First Embodiment

Figure 3:
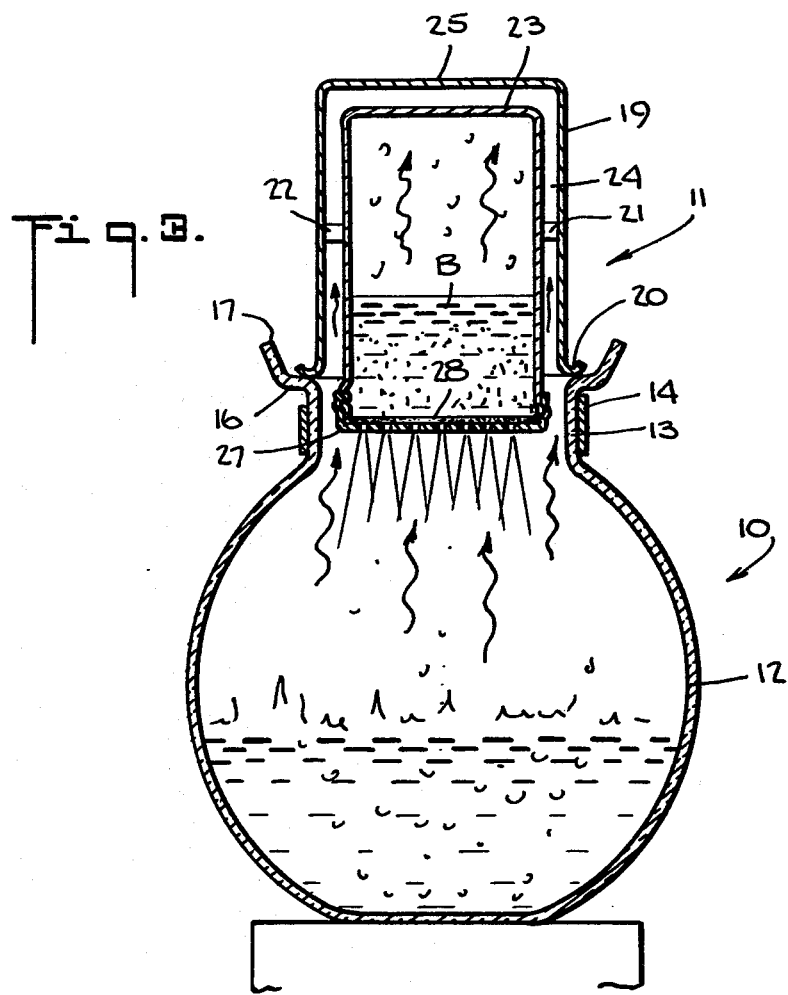
FIG. 3 is a sectional view of the assembly showing the container inverted over the decanter.

Referring now to FIGS. 1, 2 and 3, there is shown a two-component coffee maker constituted by a decanter, generally identified by numeral 10, and a separate container, generally identified by numeral 11. Decanter 10, preferably made of heat-resistant glass such as Pyrex, is formed by a bowl portion 12 having a cylindrical neck 13 clamped by a metal collar 14 to which a handle 15 is attached to facilitate handling of the decanter. Extending outwardly from neck 13 is a flange 16, and surrounding the flange is an upstanding cylindrical wall 17 provided with a spout 18. Neck 13, flange 16 and wall 17 are all integral with bowl 12.

Container 11 includes an outer cylindrical cup 19 whose diameter matches the diameter of neck 13, the rim of this cup being formed by a turned-over lip 20. This lip is restable on flange 16 which functions as a platform when the container is inverted, as shown in FIG. 3.

Coaxially supported within outer cup 19 by diametrically-opposed posts 21 and 22 is an inner cup 23 of smaller diameter to define an annular space 24, the inner cup being axially displaced from the outer cup to protrude therefrom and to define a base space 25 between the two cups. These spaces function as a steam jacket enveloping the inner cup. Outer cup 19 is provided with a handle 26, both cups being preferably of metal such as aluminum or stainless steel. Alternatively, the cups may be made of heat-resistant glass.

The rim of inner cup 19 is threaded to receive a similarly-threaded cap 27. Alternatively, the cap may be of the snap-on type. Cap 27 is perforated to permit the flow of liquid therethrough. Accommodated within cap 27 is a replaceable disc-shaped filter element 28 which is preferably of porous paper. Alternatively, a reusable cloth or fine-pored metal mesh may be used as the filter element. The perforated cap 27 in combination with the filter element 28 renders the cap permeable to water and steam, but not to coffee grounds, even when the grounds are very fine, such as a Turkish coffee grind.

Operation of Two-Component Coffee Maker

The first step in making coffee with this assembly is to fill decanter 10 with water, the decanter being placed over a suitable heater 29, as shown in FIG. 4, to bring the water to a boil.

Cap 27 is removed from the inner cup 23 of container 11 and a charge of ground coffee is placed therein appropriate to the amount of coffee brew to be made. The coffee is preferably of the very fine or Turkish-grind type. A portion of the boiling water in decanter 10 is then poured over the coffee charge in inner cup 23 to partially fill this cup, as shown in FIG. 5, and to produce in conjunction with the ground coffee a highly-concentrated brew. By partial filling is meant filling the container to within ¼ to ½ inch from the brim.

Then cap 27 is screwed over inner cup 23 and container 11 is inverted, as shown in FIG. 6, and brought down over decanter 10. This inverted relationship is illustrated in FIG. 3 where it will be seen that the lip 20 of inner cup 23 rests on flange 16 of the decanter within spout wall 17. In this condition, the steam jacket defined by spaces 24 and 25 between the inner and outer cups is in communication with the interior of decanter 10.

Since the water in the decanter is still boiling and decanter 10 is effectively sealed by container 11, the steam generated within the decanter rises into spaces 24 and 25 to envelop and heat inner cup 23. And since the rising steam has no other escape, it forces its way through permeable cap 27 to produce a head of steam above brew B which partially fills the inner cup and is highly concentrated.

Because the head of steam is trapped within the inner cup and is heated by the surrounding steam jacket, it produces an expanding gaseous force which quickly expresses the highly-concentrated brew B into the hot water below in the decanter, thereby diluting the brew to produce a brew in the decanter of the desired concentration.

The flow of the brew into the decanter occurs in less than a minute, at which point the container may be withdrawn from the decanter, and one may serve the coffee brew. Thus the time it takes to make a full pot of coffee is determined mainly by the time necessary to bring the water to a boil; for once this happens, the subsequent steps of adding some water to the inner cup and of inverting the container over the decanter can be carried out very quickly.

The resultant coffee brew is much richer than that produced with the same amount of ground coffee in the drip or filter method, for the brew is extracted by the combined action of water and steam, rather than by water alone. It becomes possible, therefore, to use less coffee to obtain a brew of the desired strength, thereby effecting significant economies.

Second Embodiment

Figure 7:
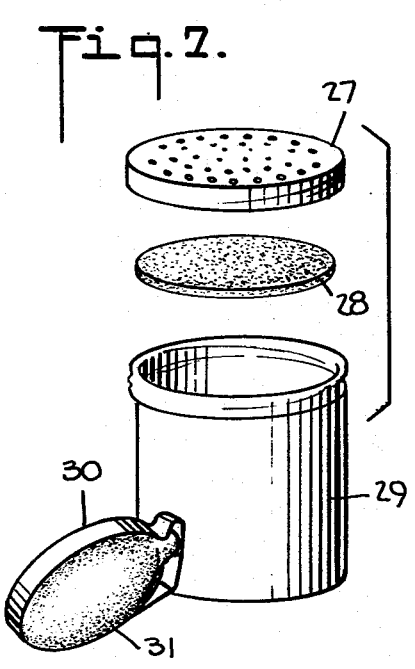
FIG. 7 shows a single component coffee maker in accordance with another embodiment of the invention.
Figure 8:
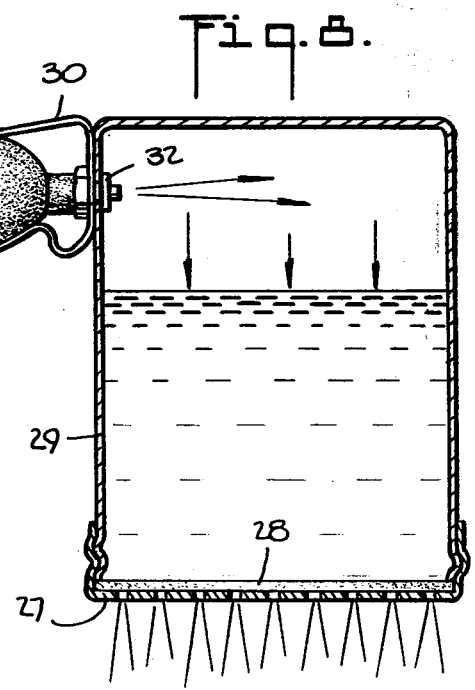
FIG. 8 is a section taken through the coffee maker shown in FIG. 7.

Referring now to FIGS. 7 and 8, there is shown a single-component coffee maker in accordance with the invention constituted by a cylindrical container 29 provided with a perforated cap 27 having a filter insert 28 therein identical to the filter-cap shown in the first embodiment.

Container 29 is provided with a handle 30 in the form of a spring metal strip which is shaped to conform to the contour of a flexible bulb 31 disposed within the handle, whereby by squeezing the handle one thereby compresses the bulb. Bulb 31 communicates with the interior of the container through a jet coupler 32 laterally mounted on the container adjacent the bottom wall thereof.

To brew coffee with this coffee maker, a charge of ground coffee, preferably a fine grind, in an amount appropriate to the capacity of the container, is placed therein. Boiling water is poured into the container at a level somewhat short of full to produce a coffee brew.

Then the container is lifted by handle 30 and inverted, as shown in FIG. 8, over a drinking cup (not shown). The operator then squeezes handle 30 to depress bulb 31, thereby projecting a jet of air into the air space above the coffee brew to create an internal pressure within the container which acts to express the brew through filter 28 into the cup below.

Thus a single-component coffee maker functions in a manner similar to the two-component maker, except that the pressure necessary to express the coffee brew is supplied manually by the operator rather than by steam. The air pump necessary to produce a jet of air is not limited to the bulb arrangement shown, for other known forms of air pumps may be used for the same purpose.

The single component container shown in FIGS. 7 and 8 may, in a modified version, operate without an air pump. To this end, an internal electric heater is installed at the base of the container, the heater serving to boil water in the container and to thereby produce a coffee brew. After the brew is available, the container is capped and inverted, and the heater is then re-energized, the heat this time serving to expand the head of air overlying the brew to produce the pressure necessary to rapidly express the brew through the filter into a drinking cup.

While there have been shown and described preferred embodiments of a coffee maker assembly in accordance with the invention, it will be appreciated that many changes and modifications may be made therein without, however, departing from the essential spirit thereof.

I claim:

1. A coffee maker assembly for rapidly producing a coffee brew of good quality, said assembly comprising:

A. a decanter for boiling water, said decanter being formed by a bowl having a cylindrical neck provided with an outwardly-extending flange; and
   B. a container constituted by a cylindrical outer cup whose diameter substantially matches the diameter of the decanter neck and a cylindrical inner cup of smaller diameter coaxially supported within the outer cup, the region between the cups defining a steam jacket, said inner cup being provided with a removable cap which is permeable to liquid and gas but not to ground coffee, whereby when a charge of ground coffee is placed in the inner cup and some of the water boiled in said decanter is poured thereover, this produces a coffee brew in the inner cup, and when the inner cup is thereafter capped and the container inverted over the decanter with the rim of the outer cup resting on the flange, steam evolved in said decanter fills the steam jacket to heat the interior of the inner cup and also penetrates the inner cup through said cap to produce a head of steam over the coffee brew therein to express the brew into the decanter.

2. An assembly as set forth in claim 1, wherein said decanter is provided with a handle having a clamp encircling said neck.

3. An assembly as set forth in claim 1, wherein said flange is surrounded by an upstanding wall having a spout formed therein.

4. An assembly as set forth in claim 1, wherein said inner cup is axially-displaced from the outer cup to create a bottom space as well as an annular space therebetween to define said steam jacket region.

5. An assembly as set forth in claim 1, wherein said cups are fabricated of stainless steel.

6. An assembly as set forth in claim 1, wherein said cap has a perforated wall and a replaceable filter disc inserted therein.

7. An assembly as set forth in claim 1, wherein said filter disk is fabricated of porous paper.

8. An assembly as set forth in claim 1, wherein said outer cup is provided with a handle adjacent its upper end.

9. An assembly as set forth in claim 1, wherein the rim of said inner cup is formed by a turned-over lip.

* * * * *